US007411010B2

(12) United States Patent
Kish et al.

(10) Patent No.: US 7,411,010 B2
(45) Date of Patent: *Aug. 12, 2008

(54) COMPOSITION FOR ANCHORING A MATERIAL IN OR TO CONCRETE OR MASONRY

(75) Inventors: Fred A. Kish, Wheeling, IL (US); Michael J. Rancich, Mundelein, IL (US); Cyndie S. Hackl, Wauconda, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/623,193

(22) Filed: Jan. 15, 2007

(65) Prior Publication Data

US 2007/0117885 A1    May 24, 2007

Related U.S. Application Data

(63) Continuation of application No. 10/940,198, filed on Sep. 13, 2004, now Pat. No. 7,163,971, which is a continuation of application No. 10/337,043, filed on Jan. 6, 2003, now Pat. No. 6,822,017, which is a continuation of application No. 09/794,199, filed on Feb. 27, 2001, now abandoned, which is a continuation of application No. 09/387,881, filed on Sep. 1, 1999, now Pat. No. 6,228,207, which is a continuation of application No. 08/877,630, filed on Jun. 20, 1997, now Pat. No. 5,965,635, which is a continuation-in-part of application No. 08/487,870, filed on Jun. 7, 1995, now Pat. No. 5,643,994, which is a continuation of application No. 08/310,709, filed on Sep. 21, 1994, now abandoned.

(51) Int. Cl.
*C09J 4/02* (2006.01)
*C08L 33/10* (2006.01)

(52) U.S. Cl. ............... 523/176; 524/522; 524/523; 526/216

(58) Field of Classification Search ........... 523/176; 526/216; 524/522–523
See application file for complete search history.

(56) References Cited

U.S. PATENT DOCUMENTS

| | | | |
|---|---|---|---|
| 2,889,582 A * | 6/1959 | Cooper ................ 156/245 |
| RE25,869 E | 10/1965 | Schuermann et al. |
| 3,309,424 A | 3/1967 | Abe et al. |
| 3,731,791 A | 5/1973 | Fourcade et al. |
| 3,847,865 A | 11/1974 | Duggins et al. |
| 4,059,551 A | 11/1977 | Weiant et al. |
| 4,076,671 A | 2/1978 | Bright |
| 4,097,405 A | 6/1978 | Watts |
| 4,104,333 A | 8/1978 | Lee, Jr. et al. |
| 4,183,991 A | 1/1980 | Smiley et al. |
| 4,221,697 A * | 9/1980 | Osborn et al. ............ 524/853 |
| 4,260,669 A | 4/1981 | Kerg |
| 4,264,489 A | 4/1981 | Ibsen et al. |
| 4,280,943 A | 7/1981 | Bivens et al. |
| 4,282,140 A | 8/1981 | Bousquet et al. |
| 4,293,665 A | 10/1981 | Zalucha et al. |
| 4,341,691 A | 7/1982 | Anuta |
| 4,362,566 A | 12/1982 | Hinterwaldner |
| 4,447,588 A | 5/1984 | Rametta |
| 4,452,944 A | 6/1984 | Dawdy |
| 4,460,625 A | 7/1984 | Emmons et al. |
| 4,467,071 A | 8/1984 | Dawdy |
| 4,472,540 A | 9/1984 | Barker |
| 4,490,497 A | 12/1984 | Evrard et al. |
| 4,530,806 A | 7/1985 | Melchior |
| 4,536,546 A | 8/1985 | Briggs |
| 4,596,857 A | 6/1986 | Doi et al. |
| 4,616,050 A | 10/1986 | Simmons et al. |
| 4,651,875 A | 3/1987 | Lang et al. |
| 4,694,044 A * | 9/1987 | Kiniwa ................. 525/178 |
| 4,706,806 A | 11/1987 | Mauthe |
| 4,718,910 A | 1/1988 | Draenert |
| 4,729,696 A | 3/1988 | Goto et al. |
| 4,769,419 A | 9/1988 | Dawdy |
| 4,791,150 A | 12/1988 | Braden et al. |
| 4,855,001 A | 8/1989 | Damico et al. |
| 4,942,201 A | 7/1990 | Briggs et al. |
| 4,944,819 A | 7/1990 | Gebauer |
| 5,069,581 A | 12/1991 | Kistner et al. |
| 5,077,324 A | 12/1991 | Kistner et al. |
| 5,080,531 A | 1/1992 | Kistner et al. |

(Continued)

FOREIGN PATENT DOCUMENTS

DE    2818068    11/1978

(Continued)

OTHER PUBLICATIONS

Seifen, Oele, Fette, Wachse, vol. 103, No. 4, 1977, Augsburg DE, pp. 108-109.

(Continued)

*Primary Examiner*—Peter Szekely
(74) *Attorney, Agent, or Firm*—Synnestvedt & Lechner LLP

(57) ABSTRACT

Disclosed are compositions for anchoring materials in or to concrete or masonry. The compositions preferably comprise alkylacrylate ester monomer and a copolymer of alkylacrylate ester and methacrylic acid monomers, and free-radical catalyst.

19 Claims, No Drawings

U.S. PATENT DOCUMENTS

| | | | |
|---|---|---|---|
| 5,096,962 A | 3/1992 | Holmes-Farley et al. | |
| 5,157,072 A | 10/1992 | Hense et al. | |
| 5,264,215 A | 11/1993 | Nakabayashi et al. | |
| 5,276,070 A | 1/1994 | Arroyo | |
| 5,498,683 A | 3/1996 | Kim | |
| 5,531,546 A | 7/1996 | Herdlicka et al. | |
| 5,544,981 A | 8/1996 | Nishida et al. | |
| 5,643,994 A | 7/1997 | Kish et al. | |
| 5,652,147 A * | 7/1997 | Kawamura et al. | 436/142 |
| 5,965,635 A | 10/1999 | Rancich et al. | |
| 6,228,207 B1 | 5/2001 | Rancich et al. | |

FOREIGN PATENT DOCUMENTS

| | | |
|---|---|---|
| DE | 2818954 | 11/1978 |
| DE | 3617702 | 12/1987 |
| DE | 3822202 | 1/1990 |
| DE | 4315788 | 11/1994 |
| EP | 0047120 | 3/1982 |
| EP | 0501176 | 9/1992 |
| EP | 0637575 | 2/1995 |
| GB | 870191 | 6/1961 |
| GB | 1521902 | 8/1978 |
| JP | 61-279 | 1/1986 |
| JP | 61-2779 | 1/1986 |

OTHER PUBLICATIONS

Walter, Dr. Wolfgang, *Lehrbuch der Organischen Chemie*, S. Hirzel Verlag Stuttgart 1988, pp. 76-77.

* cited by examiner

COMPOSITION FOR ANCHORING A MATERIAL IN OR TO CONCRETE OR MASONRY

CROSS-REFERENCE TO RELATED APPLICATIONS

This application is a continuation of application Ser. No. 10/940,198, filed Sep. 13, 2004, which is a continuation of application Ser. No. 10/337,043, filed Jan. 06, 2003, now U.S. Pat. No. 7,163,971, which is a continuation of application Ser. No. 09/794,199, filed Feb. 27, 2001, now abandoned, which is a continuation of application Ser. No. 09/387,881, filed Sep. 1, 1999, now U.S. Pat. No. 6,228,207, which is a continuation of patented application Ser. No. 08/877,630, filed Jun. 20, 1997, now U.S. Pat. No. 5,965,635, which is a continuation-in-part of patented application Ser. No. 08/487,870, filed Jun. 7, 1995, now U.S. Pat. No. 5,643,994, which is a continuation of application Ser. No. 08/310,709, filed Sep. 21, 1994, now abandoned.

TECHNICAL FIELD

This invention relates to a composition for anchoring materials in or to concrete or masonry. More particularly, this invention relates to an alkylacrylate ester/methacrylic acid copolymer composition for anchoring materials in or to concrete or masonry.

BACKGROUND OF THE INVENTION

Many applications require that a material be anchored in or to concrete or masonry. For example, anchor bolts are employed in various fields of engineering as strengthening or reinforcing members in rock formations, or concrete or masonry structural bodies. The bolts, which are typically metallic, are inserted into holes in the rock formations, or concrete or masonry structural bodies, are fixed or anchored therein by means of an anchor composition. Typically, the anchor composition cures or hardens (polymerizes) to form a strong bond between the rock formation, or the concrete or masonry structural body and the bolt. In concrete or masonry, anchor bolts are used for reinforcement. Anchor bolts are also used for attaching objects to concrete or masonry. Objects that have been attached to concrete or masonry using anchor bolts include, but are not limited to, electrical conduits, panels, piping and wall sections. Adhesive anchors are preferred over mechanical anchors for anchoring in soft concrete or masonry because adhesive anchors place less stress on the concrete or masonry. As used herein, the term "masonry" shall include, but is not limited to, stone, brick, ceramic tile, cement tile, hollow concrete block and solid concrete block.

A useful anchor composition should be inexpensive, provide for a strong bond between the concrete or masonry and the material to be anchored to the concrete or masonry, be easy to dispense at the location of use and have a long storage shelf life. Some anchor compositions that have been used include compositions based on aromatic vinyl esters, aromatic polyesters and epoxies. These compositions can be expensive or may not provide the desired bond strength between the concrete or masonry and the material that is anchored in or to the concrete or masonry.

An example of the anchor compositions of the prior art is found in Japanese Patent Application Sho59-122762-("JP '762"). Generally, JP '762 discloses an anchor composition comprising a monomer, a polymer soluble in the monomer, aggregate and a hardening agent. With respect to the monomer component, JP '762 discloses a broad range of compounds which include methacrylate esters. With respect to the polymer component, JP '762 discloses a similarly broad range of compounds which includes methacrylate esters and acrylic acid, and further discloses the use of copolymers. Moreover, JP '762 discloses a composition comprising 70 to 95% by weight of the monomer and 5 to 30% by weight of the polymer.

Notably, however, JP '762 fails to recognize the unexpected and surprising properties of fast cure time and pull out strength realized by the selection of a methacrylate ester monomer and a copolymer of a methacrylic ester and methacrylic acid in the formation of an anchor composition as shown herein. The unexpected and surprising results achieved by this particular combination is shown in certain of the examples set forth below in which significantly shorter cure times and greater pull out strengths are exhibited by the compositions of the present invention as compared to other compositions which fall within the scope of the broad disclosure of JP '762. As a result, the composition of the present invention represent a novel and unobvious advancement over the prior art.

SUMMARY OF THE INVENTION

The present invention provides a composition for anchoring materials in or to concrete or masonry that comprises from about 20% to about 90% by weight of the entire composition of a alkylacrylate ester monomer and an alkylacrylate ester/methacrylic acid copolymer; a free-radical catalyst; and a filler.

In a preferred embodiment, the present invention provides a composition for anchoring materials in or to concrete or masonry that is made by mixing a first composition and a second composition. The first composition comprises from about 20% to about 90% by weight of the entire composition of a methacrylate ester monomer and methacrylate ester/methacrylic acid copolymer; and a filler. The second composition comprises a free-radical catalyst.

DETAILED DESCRIPTION OF THE INVENTION

The present invention provides an anchor composition for anchoring materials in or to concrete or masonry. The materials to be anchored in or to concrete or masonry include, but are not limited to, metallic objects, such as steel bolts, ceramics, other concrete or masonry objects, plastics, glasses and woods.

The composition comprises methacrylate ester monomer, a methacrylate ester/methacrylic acid copolymer, a free-radical catalyst and a filler. It may also be desirable to include in the composition a thixotropic agent, a chain transfer agent, a free-radical inhibitor, a fragrance, an activator, a promoter and/or a pigment. It is also recognized that other components known to those skilled in the art may be included in the composition. Such components may include, but are not limited to, antifoaming agents, wetting agents, fungicides, impact modifiers, crosslinking agents and coupling agents.

The composition may be dispensed using various methods known to those skilled in the art. For example, the composition may be dispensed using a dual cartridge device similar to a caulk gun, or the composition may be dispensed using a glass or film capsule. The composition may also be dispensed in bulk from bulk containers using meter-mix equipment, which is known to those skilled in the art. U.S. Pat. Nos. 4,651,875, 4,706,806 and 4,729,696, the disclosures of which are hereby incorporated by reference, are directed to glass capsules. It is recognized that the amounts of the various components of the anchor composition may vary depending on the type of dispensing system used. In preferred dispensing methods, the anchor composition is formed by the mixing of a first composition and a second composition.

Typically, the mixing occurs immediately before the anchor composition is to be used. For example, when the anchor composition is dispensed using a dispensing gun, the first composition and the second composition, which are contained in separate cartridges of the dispensing gun, may be mixed as they are ejected from the cartridges and applied to either the concrete or masonry, the material to be anchored to the concrete or masonry or both. Similarly, when the anchor composition is dispensed using a glass capsule, the capsule is typically comprised of two chambers that, contain the first composition and the second composition respectively. When the glass capsule is crushed, the two chambers are crushed and the contents are allowed to mix, forming the anchor composition. Last, when the anchor composition is dispersed in bulk, a first composition and a second composition may be stored in separate bulk containers and combined through pumping with mixing in the appropriate ratio to make the anchor composition.

The anchor composition preferably contains a methacrylate ester monomer and a methacrylate ester/methacrylic acid copolymer. It is preferable if the methacrylate ester/methacrylic acid copolymer has a weight-average molecular weight in the range of about 10,000 to about 60,000. More preferably, the copolymer has weight-average molecular weight in the range of about 20,000 to about 40,000.

In general, the methacrylate ester/methacrylic acid copolymer is soluble in the methacrylate ester monomer to form a solution. The ratio of copolymer to monomer is in the range of about 1 to 9 to about 2.5 to 1 by weight. Preferably, the copolymer to monomer ratio is in the range of about 1 to 4 to about 1 to 1.5 by weight. More preferably, the copolymer to monomer ratio is in the range of about 1 to 4 to about 1 to 2.5 by weight.

As used herein, the phrase "methacrylate ester monomer" shall mean esters of methacrylic acid, including, but not limited to, the methyl, ethyl, propyl, isopropyl, butyl, tert-butyl, cyclohexyl, 2-ethylhexyl and tetrahydrofurfuryl esters of methacrylic acid. As used herein the phrase "methacrylate ester/methacrylic acid copolymer" shall mean a copolymer which can theoretically be made from methacrylate ester and methacrylic acid monomers.

The copolymer may be a random, block, graft or alternating copolymer. The polymer also can be linear or branched and can be based on two or more different methacrylate ester monomers. It is also contemplated that the methacrylate ester monomer component may be a mixture of different methacrylate monomers, and the methacrylate ester/methacrylic acid copolymer component may be a mixture of more than one copolymer.

Generally the monomer/copolymer combination is present in the anchoring composition in the range of about 20% to about 90% by weight of the entire composition. Preferably, the monomer/copolymer combination is present in the anchoring composition is an amount in the range of about 20% to about 60%. More preferably, the monomer/copolymer combination is about 40% to about 45% by weight of the entire composition when the composition is dispensed using a dispensing gun, and about 20% to about 30% by weight of the entire composition when the composition is dispensed using a glass capsule.

The anchor composition also comprises a free-radical catalyst, which starts the free-radical polymerization of the methacrylate ester and methacrylic acid monomers in the composition, which results in a hardened or cured composition. Examples of free-radical catalysts include, but are not limited to, peroxides, such as the diacyl peroxides, hydroperoxides, peresters, peracids and radiant energy or thermal energy, i.e. ultraviolet light and heat. Examples of specific free-radical catalysts include, but are not limited to, dibenzoyl peroxide, cumene hydroperoxide, tertiary butyl peroxide, dicumyl peroxide, tertiary butyl peroxide acetate, tertiary butyl perbenzoate and ditertiary butyl azodiisobutyronitrile. Examples of the diacyl peroxides include, but are not limited to, dibenzoyl peroxide, succinic acid peroxide, dilauroyl peroxide, didecanoyl peroxide and diisononanoyl peroxide. The most preferred free-radical catalyst is dibenzoyl peroxide. It is also contemplated that more than one free-radical catalyst may be used in the composition. The free-radical catalyst is usually present in the composition in the range from about 0.5% to about 10% by weight of the entire composition. Preferably, the catalyst is found in the composition in the range of about 1% to about 5% by weight of the entire composition. Even more preferably, the free-radical catalyst is about 2% by weight of the entire composition.

The composition can also include a catalyst activator (also called an initiator). Throughout this application, the terms "activator" and "initiator" are used interchangeably. Representative activators include an aldehyde-amine condensation product, organic sulfonyl chlorides, tertiary amines or mixtures thereof. For example, such a condensation product can be made from butyraldehyde and a primary amine, such an amine being, for example, aniline or butylamine. Also suitable as activators are tertiary amines such as N,N-dimethyl aniline, N,N-dimethyl toluidine, N,N-diethylaniline, N,N-diethyl toluidine, N,N-bis(2-hydroxyethyl)-p-toluidine, N,N-bis(hydroxypropyl)-p-toluidine and the like. A preferred activator is N,N-bis(2-hydroxyethyl)-p-toluidine.

The composition can also include a promoter, which is an organic salt of a transition metal such as cobalt, nickel, manganese or iron naphthenate, copper octoate, copper acetylacetonate, iron hexoate or iron propionate.

In concrete anchoring, much of the heat of polymerization is lost to the mass of concrete. Therefore, activators such as N,N-bis(2-hydroxyethyl)-p-toluidine may be used to achieve the desired rapid cure times. However, when anchoring in hollow concrete blocks, portions of the anchor composition may not contact the concrete, and heat loss to the surroundings is minimized, which can result in incomplete curing of the bulk anchor composition. In such cases, it may be preferable to add a chain transfer agent to the composition. Chain transfer agents are discussed below. The amount of activator and chain transfer agent that gives acceptable cure speeds, shelf life and bulk cure properties for a particular application and composition can be determined by those skilled in the art by routine optimization.

The initiators and activators, if part of the composition, can be added in an amount up to about 10% by weight of the entire composition. Preferred amounts are in the range of about 0.01 to about 1.5%. Promoters are typically used in amounts up to about 0.5% by weight of the composition, and preferably about 1 part per million to about 0.5% by weight of the entire composition.

The anchor composition may also comprise a thixotropic agent. A thixotropic agent that is added to a composition causes the composition to become more fluid, i.e. less viscous, when agitated, stirred or mixed or otherwise subjected to such shear forces. It is useful to include a thixotropic agent in the anchor composition to insure that the composition has the desired viscosity during application and after the composition is applied. In addition, a thixotropic agent may be added to an anchor composition to prevent the settling of other solid components of the composition and to increase the viscosity of the composition. The thixotropic agent also facilitates dispensing of the composition because when a shear force is applied, e.g. expulsion of the composition from a dispensing gun, the thixotropic agent makes the resulting composition less viscous, and therefore, more easy to expel from the cartridges of the dispensing gun. The thixotropic agent may be found in the anchor composition in an amount in the range of 0.5% to about 10% by weight of the entire composition. Preferably, the thixotropic agent is found in the composition in an amount in the range of about 2% to about 7% by weight of the entire composition. Most preferably, the thixotropic agent is about 5% when the composition is dispensed from a dispensing gun. Typically, no thixotropic agent is needed when the anchor composition is dispensed using a glass capsule. An example of a suitable preferred thixotropic agent is fumed silica. Also contemplated are the various silicas made by the various methods known in the art, including pyrolysis of silicon tetrachloride and precipitation. Other suitable thixotropic agents include the various organoclays and various fibers. In some anchor compositions, the thixotropic agent may also be considered a filler. A suitable silica thixotropic agent is Aerosile* R202, which may be obtained from the Degussa Corporation of Ridgefield Park, N.J. It is also contemplated that more than one thixotropic agent may be used in the anchor composition.

The anchor composition of the present invention also comprises one or more fillers. Fillers are typically added to compositions for various reasons, including to reduce shrinkage of the composition that may occur during polymerization and to reduce the cost of the composition, as fillers replace a portion of the more expensive components of the anchor composition. The filler may also provide for improved bond strength of the anchor composition when polymerized and help to prevent the settling out of other particulate materials in the composition. Generally, the filler is an inert, inorganic, solid, particulate compound. By inert it is meant that the filler does not detrimentally interact with any other component of the composition. Examples of suitable fillers include, but are not limited to, crushed glass, glass beads, quartz, silica, limestone, alumina, various clays, diatomaceous earth and other materials such as mica, flint powder, kryolite, alumina trihydrate, talc, sand, pyrophyllite, blanc fixe, granulated polymers such as polyethylene, hollow glass and polymer beads, zinc oxide, novaculite, calcium sulfate and mixtures thereof. Preferred fillers are quartz, glass and silica. Fillers may be treated with coupling agents to improve bonding to the polymer matrix. Examples of coupling agents which may be used to treat the fillers are silanes, titanates and zirconates.

Generally, fillers can be found in the composition in an amount in the range of 10% to about 90% by weight of the composition. In certain preferred embodiments in which the anchor composition is dispensed by means of a dispensing gun, fillers are found in the range of about 20 to about 80% by weight of the composition, and more preferably, about 40 to about 65% by weight of the composition. In certain preferred embodiments in which the anchor composition is dispensed by means of a glass capsule, fillers, including the glass or film capsule, are found in the range of about 40 to about 90% by weight of the composition, and more preferably, about 65 to about 80% by weight of the composition.

The exact particle size of the filler will depend on the desired consistency of the composition and the method for dispensing the anchor composition. For example, fillers having a large average particle size (300 microns and larger) may clog static mixers that are used in dispensing systems such as dispensing guns. On the other hand, fillers having a large particle size can be used in glass capsules. Preferred particle sizes are about 50 microns or larger. However, in cases where a filler is used to prevent the settling out of other particulate matter in a composition, a particle size smaller than 50 microns may be desired. It is also recognized that a filler having a particle size less than 50 microns may be used in combination with other fillers, some having particle sizes greater than 50 microns.

Preferred fillers for use in anchor compositions that are to be dispensed using a dispensing gun have average particle sizes in the range of about 50 to about 275 microns, and even more preferably in the range of about 150 to 200 microns. Preferred fillers for use in anchor compositions that are to be dispensed using a glass capsule have average particles sizes in the range of about 100 to about 3,000 microns, and even more preferably in the range of about 1200 to 2000 microns.

The anchor composition may also include a free-radical chain transfer agent. Free-radical chain transfer agents are included in anchor compositions to facilitate polymerization. Chain transfer agents also have the effect of limiting the molecular weight of the polymers that are formed by the polymerization. The use of a free-radical chain transfer agent provides for an acceptable polymerization speed and for more complete polymerization of the anchor composition, particularly when a large mass of the composition is to be polymerized. Preferred free-radical chain transfer agents include mercaptans such as dodecyl mercaptan. In addition, other chain transfer agents are known to those skilled in the art, and a suitable free-radical chain transfer agent may be readily selected by those skilled in the art. In certain preferred embodiments in which the anchor composition is dispensed by means of a dispensing gun, the free-radical chain transfer agent may be found in the range of about 0 to about 4% by weight of the composition, and more preferably, about 0.1 to about 2% by weight of the composition. In certain preferred embodiments in which the anchor composition is dispensed by means of a glass capsule, the free-radical chain transfer agent may be found in the range of about 0 to about 5% by weight of the monomer/polymer composition, and more preferably, about 0.5 to about 4% by weight of the monomer/polymer composition.

The anchor composition may also include a free-radical inhibitor. A free-radical inhibitor is added to the composition to inhibit the polymerization of monomers in the composition until such polymerization is desired. The addition of a free-radical inhibitor also increases the storage shelf life of the anchor composition. In certain preferred embodiments in which the anchor composition is dispensed by means of a dispensing gun, the free-radical inhibitor may be found in the range of about 0 to about 0.1% by weight of the composition, and more preferably, about 0.005 to about 0.05% by weight of the composition. In certain preferred embodiments in which the anchor composition is dispensed by means of a glass capsule, the free-radical inhibitor may be found in the range of about 0 to about 0.16% by weight of the monomer/polymer composition, and more preferably, about 0.02 to about 0.08% by weight of the monomer/polymer composition.

In one embodiment of the present invention, the anchor composition is formed by mixing a first composition and a second composition. The first composition contains the polymerizable monomers and may contain an inhibitor to prevent polymerization of the monomers until desired, and the second composition contains a free-radical catalyst. When the first composition and the second composition are combined, polymerization occurs. Free-radical inhibitors are known to those skilled in the art. A preferred free-radical inhibitor is trimethyl hydroquinone. Other suitable free-radical inhibitors include but are not limited to, hydroquinone, hydroquinone monomethyl ether, t-butyl catechol and naphthaquinone. It is also contemplated that more than one free radical inhibitor may be employed in the anchor composition.

The anchor composition may also contain a fragrance. A fragrance is used in an anchoring composition to mask any odor of the composition that is thought undesirable or unpleasant. A preferred fragrance is Atlanta Fragrance 16332. Similarly, a pigment may be employed to color the anchoring composition. Suitable pigments are known to those skilled in the art.

In a preferred embodiment the anchor adhesive is made by mixing a first composition and a second composition. The first composition comprises a methacrylate ester monomer, a methacrylate ester/methacrylic acid copolymer and a filler. The first composition may also comprise a thixotropic agent, a chain transfer agent, a free-radical inhibitor, a fragrance, an activator, a promoter and/or a pigment. The second composition contains a free-radical catalyst. The second composition may also include a filler, a thixotropic agent, a fragrance, and/or a pigment. It is also contemplated that both the first composition and the second composition may contain some of the same components.

The ratio of the first composition to the second composition may be in the range of 1 to 1 to about 40 to 1. Preferably, the ratio of the first composition to the second composition is about 10 to 1.

Also provided is a method for anchoring a material in or to concrete or masonry that comprises the steps of delivering the above-described anchor composition to concrete or masonry, the material to be anchored to the concrete or masonry or both; contacting the material to be anchored, the concrete or masonry and the anchor composition; and polymerizing the anchor composition.

The delivery of the anchor composition may be accomplished by any method known to those skilled in the art, including by cartridge in a dispensing gun, by glass canaules or from bulk containers through meter-mix equipment. The composition is applied to either the concrete or masonry, the material to be anchored in or to the concrete or masonry, or both. Then, the concrete or masonry and the material to be anchored to the concrete or masonry are contacted so that both the concrete or masonry and the material to be anchored comes into contact with the anchor composition. The anchor composition is then polymerized.

The following examples are provided to illustrate particular embodiments of the invention and are not intended to limit the scope of the invention or the claims in any manner.

EXAMPLES

Experimental Protocols

Preparation of Anchor Compositions to be Dispensed From a Cartridge Using a Dispensing Gun The appropriate amounts of polymer and monomer are weighed. The monomer is added to a container and the polymer is slowly added, with mixing to obtain a polymer in monomer solution. It is preferred to mix the monomer and polymer solution using a disperser, and then to further mix the solution on a jar mill at 3-5 rpm for between 24-48 hours.

To an appropriate amount of the above monomer/polymer solution is added inhibitor, activator, chain transfer agent, fragrance and other ingredients. The composition is mixed, preferably using a dispenser. Next, the thixotropic agent is added with shear mixing followed by addition of the filler. If more than one filler is to be included in the anchor composition, it is preferable to add the first filler, then mix, then add the second filler and so on until the desired number of fillers have been added to the composition. To make a two component composition, each component may be made separately according to the above-described procedure.

Preparation of Anchor Compositions to be Dispensed From a Glass Capsule

The appropriate amounts of polymer and monomer are weighed. The monomer is added to a container and the polymer is slowly added, with mixing. It is preferred if the monomer and polymer solution are mixed using a disperser and then further mixed on a jar mill at 3-5 rpm for between 24-48 hours. Inhibitor and activator are added, with mixing, as desired.

The free-radical catalyst, typically a peroxide, is introduced into a small glass tube (inner tube), which is then sealed. The sealed small glass tube is placed into a large glass tube (outer tube) that has been sealed at one end. The above-described polymer/monomer solution and any filler is added to the large glass tube and the large glass tube is sealed.

Pull Out Performance

Medium Weight Concrete Block

A medium weight concrete block that was approximately 4"×8"×16"; which was free of surface moisture was used. Typically, five replicate pull out tests were run for each adhesive composition tested.

First, three equally spaced 65 mm deep holes were drilled in the 8"×16" side of the concrete block. Then, the holes were cleaned with a brush, with compressed air and a vacuum. An adhesive composition was injected into the drilled holes, and a ¼"-20 threads per inch×5" stainless steel rod type 304 is inserted into the adhesive-containing hole with a twisting motion. The time before pull out testing (also called cure time) was in the range of about 0.5 hours to about 72 hours. The stainless steel rod was then connected to an Instron universal tester, Model TTC, Instron Corporation, Canton, Mass., and the rods were pulled at 0.2"/minute until failure. The maximum load and failure type was then recorded. Preferably, in an acceptable anchor composition, the pull out performance is about 2200 pounds or greater in concrete block. Most preferably, the material that has been anchored to the concrete or masonry, or the concert or masonry itself fails before the adhesive composition.

Medium Weight Hollow Concrete Block

A 6"×8"×16" (1" wall thickness) medium weight hollow concrete block, free of surface dampness, was drilled with two 16 mm holes on the 8"×16" side of the block (four total). The holes were cleaned of dust, and 16 mm polyethylene screens were installed in the holes. The adhesive composition is injected into the screen to fill the screen, and a 10 mm rod is inserted into the adhesive in the screen with a twisting motion. The adhesive was allowed to cure, typically for 24 hours. The rod was then pulled on a universal tester at 0.2"/min. until failure of the adhesive, rod or concrete. (16 mm polyethylene screens and 10 mm rods may be obtained from SPIT, Valence, France.)

5,000 psi Compressive Strength Concrete

A 3'×6'×12" to 18" deep 4,000-5,000 psi concrete slab, which was cured at least 28 days, and which was free of surface moisture, was drilled with holes. The holes were spaced in the concrete in accordance with ASTM E488-90. The holes were cleaned, and adhesive was injected into the holes followed by the insertion of Grade 5 zinc plated rods with a chrome seal. The adhesive was cured for a period, typically 2 to 24 hours, and the rods were then pulled using a hydraulic jack until failure of the adhesive, rod or concrete.

Torque Performance

A hollow medium weight concrete block having dimensions 6"×8"×16" (1 inch wall thickness), free of surface dampness, was drilled with 2 16 mm holes in each hollow cavity on the 8"×16" side of the block (four total). The holes were cleaned and then a 16 mm polyethylene screen, which are known to those skilled in the art, was inserted into the holes. An adhesive composition was injected to fill the screens, and a 10 mm rod was inserted into the screens containing the adhesive. The adhesive was allowed to cure for a certain time and then a ¼" thick steel plate with a hole was placed over the rod. A washer was installed and a nut was hand tightened on the rod. The nut was torqued clockwise with a socket wrench and torque transducer until failure of the rod, concrete or adhesive.

It should be noted that three types of concrete blocks that are known to those skilled in the art have been used in the various examples set forth below: medium weight concrete block; 5,000 psi compressive strength concrete; and medium weight hollow concrete block. Unless specified otherwise, "concrete block" or "concrete" shall mean medium weight concrete block.

Materials

The following table shows materials, specific chemical compositions, trade names, suppliers and locations of the suppliers for the various materials. This list is intended to be illustrative of various materials and should not be construed as limiting the specification or the claims in any manner.

| Material | Composition | Trade Name | Supplier | Location |
|---|---|---|---|---|
| PMMA 2016 | Methyl/n-butyl methacrylate Copolymer | Elvacite ® 2016 | ICI Acrylics | Wilmington, DE |
| PMMA 2008 | Methyl methacrylate/methacrylic acid (2%) copolymer | Elvacite ® 2008 | ICI Acrylics | Wilmington, DE |
| PMMA 2010 | Polymethyl methacrylate | Elvacite ® 2010 | ICI Acrylics | Wilmington, DE |
| PMMA 2021 | Methyl methacrylate/ethyl acrylate (5%) copolymer | Elvacite ® 2021 | ICI Acrylics | Wilmington, DE |
| MMA Monomer | Methyl methacrylate | | ICI Acrylics | Wilmington, DE |
| HET | N,N-bis(2-hydroxyethyl)-p-toluidine | | RSA Corp. | Danbury, CT |
| Dodecyl Mercaptan | | | Aldrich Chemical | Milwaukee, WI |
| Tamsil ™ 8 | Silica (2 micron) | Tamsil ™ 8 | Unimin Specialty Minerals | Elco, IL |
| F55 Silica Sand | Silica Sand (ca. 200 microns) | | U.S. Silica | Ottawa, IL |
| ATH 00 20774 | Treated alumina Trihydrate (8 micron) | | Nyco Minerals Inc. | Willsboro, NY |
| Quartz 1/2 | Quartz 1/2 (ca. 150 micron) | | Agsco Corp. | Wheeling, IL |
| Huber SB-30-SP | Alumina Trihydrate (ca. 50 micron) | | Huber Solem Division | Norcross, GA |
| ATH 21 20774 | Treated Alumina Trihydrate (2 micron) | | Nyco Minerals Inc. | Willsboro, NY |
| AFR 400 | Di-benzoyl peroxide in Plasticizer (40% BPO) | | ATOCHEM North America | Buffalo, NY |
| ANS | Di-benzoyl peroxide in Plasticizer (55% BPO) | | ATOCHEM North America | Buffalo, NY |
| CAB-O-SIL ® M5 | Treated Fumed Silica | | Cabot Corp., Cab-O-Sil Division | Tuscola, IL |
| Aerosil ® R202 | Treated Fumed Silica | Aerosil ® R202 | Degussa | Ridgefield Park, NJ |
| Fragrance-16332 | | | Atlanta Fragrance | Kennesaw, GA |
| TMHQ | Trimethyl Hydroquinone | | Aldrich Chemical | Milwaukee, WI |
| Cadox BFF 50 | Dibenzoyl Peroxide | | Akzo Chemicals Inc. | Dobbs Ferry, NY |
| Quartz #4 | | | Agsco Corp. | Wheeling, IL |

BPO is dibenzoyl peroxide.

Examples of Adhesive Compositions

Example 1

| First Composition* | % By Weight of First Composition |
|---|---|
| MMA monomer/MMA polymer solution (20% Elvacite ® 2021 in MMA) | 39.85 |
| Quartz 1/2 | 53.4 |
| Dodecyl mercaptan | 0.5 |
| Trimethyl hydroquinone | 0.0161 |
| Silica (Aerosil ® R202) | 5.4 |
| N,N-bis(2-hydroxyethyl)-p-toluidine | 0.5 |
| Fragrance-16332 | 0.35 |

-continued

| Second Composition* | % By Weight of Second Composition |
|---|---|
| Di-benzoyl peroxide (AFR 400-40% di-benzoyl peroxide) | 50 |
| Silica (Tamsil ™ 8) | 30 |
| Quartz 1/2 | 20 |

*Pigments were added to both the first composition and the second composition. The first composition contained about 0.02% American Colors VC-10000 white, and the second composition contained about 1% of American Colors VC-50457 rust. The above-described anchor composition is preferably dispensed by a dispensing gun or by bulk dispensation using meter-mix equipment.

Example 2

| Composition | % By Weight of Composition |
|---|---|
| Large Glass Tube | |
| MMA monomer/MMA polymer solution (20% Elvacite ® 2021 in MMA) | 22.10 |
| N,N-bis(2-hydroxyethyl)-p-toluidine | 0.67 |
| Quartz #4 | 41.78 |
| Small Glass Tube | |
| Di-benzoyl peroxide (Cadox BFF50)* | 1.37 |
| Glass | 34.08 |

The above-described anchor composition is preferably dispensed by a glass capsule. The glass is supplied by the small and large glass tubes that hold the composition when the delivery system is crushed.

Example 3

| First Composition | % By Weight of First Composition |
|---|---|
| Solution of MMA monomer and MMA/MAA copolymer (30% Elvacite ® 2008C in MMA) | 43.289 |
| Trimethyl Hydroquinone | 0.016 |
| HET | 0.518 |
| Aerosil ® R202 | 4.123 |
| Agsco 100-140 silica sand | 51.535 |
| Dodecyl Mercaptan | 0.518 |

| Second Composition | % By Weight of Second Composition |
|---|---|
| AFR 400 (40% BPO) | 49.75 |
| Agsco Quartz 1/2 | 19.90 |
| Tamsil ™ 8 (silica) | 29.85 |
| VC-80000 Black (iron oxide) | 0.50 |

The first composition and the second composition were combined in a ratio of 10:1 respectively. The above-described anchor composition is preferably dispensed by a dispensing gun or by bulk dispensation using meter-mix equipment. After a 24 hour period of cure, the pull out performance of the composition of Example 3 was measured at 3,832 lbs.

Example 4

| | % By Weight of Composition |
|---|---|
| Resin Solution Composition | |
| MMA monomer | 59.41 |
| MMA/MAA copolymer | 34.89 |
| Trimethyl Hydroquinone | 0.0377 |
| HET | 3.77 |
| Dodecyl Mercaptan | 1.89 |
| Glass Capsule Composition | |
| Resin Solution Composition | 22.17 |
| Lucidol CH50 (50% BPO) | 2.03 |
| Quartz sand (800 to 2000 microns) | 33.39 |
| Glass (inside and outside vials) | 42.42 |

The above-described anchor composition is preferably dispensed by glass capsules. The catalyst was placed into a vial and then sealed. The sealed vial containing the catalyst was then placed into a larger second vial together with the components of the resin solution composition and the filler in accordance with the above weight percentages. The second vial was then sealed.

Example 5

| First Composition | % By Weight of First Composition |
|---|---|
| PMMA 2021 | 9.0 |
| MMA Monomer | 20.9 |
| HET | 0.3 |
| ATH 21 20774 | 29.9 |
| Quartz | 39.9 |

| Second Composition | % By Weight of Second Composition |
|---|---|
| AFR 400 | 50 |
| Quartz 1/2 | 20 |
| ATH 21 20774 | 30 |

The first composition and the second composition were combined in a ratio of 10:1 respectively. The pull out performance was measured in medium weight concrete block. After a 72 hour period of cure, the pull out performance of the composition of Example 5 was measured at 2,830 lbs.

Example 6

This example shows various compositions that may be used in practicing the present invention.

| | Composition | | | |
|---|---|---|---|---|
| | 1 | 2 | 3 | 4 |
| Type of PMMA | 2021 | 2008 | 2021 | 2021 |
| % Polymer in Monomer | 10 | 55 | 30 | 20 |
| % Polymer Solution | 39.73 | 88.2 | 27.2 | 38.8 |
| Filler-Quartz 1/2 | 53 | 10.3 | 36.3 | 51.8 |

-continued

| Type of PMMA | Composition | | | |
|---|---|---|---|---|
| | 1<br>2021 | 2<br>2008 | 3<br>2021 | 4<br>2021 |
| Filler-Nyco ATH 21 | | | 36.3 | |
| Thixotropic Agent | 53 | 0.5 | | 9.1 |
| Pull out in Concrete Block (lbs) | 2410 | 2200 | 2605 | 2510 |

The above compositions were injected into concrete block using a dispensing gun containing a coaxial cartridge. In each composition, HET was used as a catalyst activator (0.5 to 1.3%). Dodecyl mercaptan was used as a chain transfer agent in compositions 1 and 2 (0.5%), and Aerosil● R202 was used as a thixotropic agent, except for composition 4; which used Attagel 50. The compositions were dispensed in a ratio of 10 parts of the above described compositions to 1 part activator. The activator comprised 50% AFR 400, 20% Quartz ½ and 30% Tamsil™ 8. The pull out performance was measured in medium weight concrete block after a cure time of between 24-72 hours. In general, a pull out performance of 2200 lbs or greater in medium weight concrete block is required.

Comparative Examples

Example 7

Table 1 below compares a commercially available anchor adhesive product, Ready Fix, which is based on aromatic polyesters, with commercially available structural adhesives based on acrylates having no inorganic particulate filler.

TABLE 1

| Composition | Pull Out (lbs) |
|---|---|
| Ready Fix | 2160 |
| Plexus MA 300 | 400 |
| Plexus MA 310 | 850 |
| Plexus MA 320 | 260 |

Ready Fix may be obtained from Red Head, Scotland. Plexus MA 300, Plexus MA 310 and Plexus MA 320 may be obtained from ITW Adhesive Systems, Danvers, Mass.

Table 1 shows that the pull out performance of the commercially available acrylate structural adhesives are below the pull out performance acceptable for an anchor adhesive.

Example 8

Table 2 below shows the pull out performance of anchor compositions containing methyl methacrylate polymers of various weight average molecular weights. Each composition contained about 99.75% of a PMMA/MMA solution. The compositions were mixed to a viscosity of approximately 4000 to 10,000 centipoise. (Viscosities were measured on a Brookfield viscometer using an HA6 spindle at 23° C.). Each solution also contained 0.25% HET and 5% ANS (40% BPO). No fillers were used. Each of the compositions were mixed by hand and injected into concrete block using a dispensing gun containing a one component cartridge.

TABLE 2

| | Polymer | | | |
|---|---|---|---|---|
| | PMMA<br>2016 | PMMA<br>2008 | PMMA<br>2010 | PMMA<br>2021 |
| Polymer Type | Methyl/n-butyl methacrylate copolymer | Methyl-methacrylate/methacrylic acid copolymer | Methyl-methacrylate/ethyl acrylate copolymer | Methyl-methacrylate/ethyl acrylate copolymer |
| Polymer Weight Average Molecular Weight | 60,000 | 36,000 | 84,000 | 118,000 |
| Pull Out (lbs)-72 hr cure | 1120 | 1250 | 1380 | 1700 |

The data show that, generally, as the molecular weight of the polymer increases, the pull out strength also increases. The data also show that the pull out strength of the homopolymers (PMMA 2008, 2010 and 2021) was larger than the copolymer (PMMA 2016).

Example 9

Table 3 below shows the pull-out performance of anchor compositions containing various types and sizes of fillers. Each anchor composition contains a solution of PMMA/MMA mixed to have a viscosity of about 4000 centipoise (viscosities were measured on a Brookfield viscometer using an HA6 spindle at 10 rpm at 23° C.), 0.17-25% HET and 3-6% ANS (40% BPO). In addition, compositions 3 and 4 contain 0.6 to 1.0% CAB-O-SIL● M5.

TABLE 3

| | Polymer | | | | | |
|---|---|---|---|---|---|---|
| | PMMA<br>2016 | PMMA<br>2016 | PMMA<br>2016 | PMMA<br>2021 | PMMA<br>2021 | PMMA<br>2021 |
| % PMMA/MMA Solution | 67.0 | 49.9 | 59.3 | 39.6 | 33.1 | 29.9 |
| Filler 1 Size (microns) | 2 | 8 | 200 | 200 | 200 | 50 |
| Filler 1 wt % | 32.8 | 49.9 | 39.5 | 59.6 | 66.6 | 39.9 |
| Filler 2 Size (microns) | | | | | | 8 |
| Filler 2 wt % | | | | | | 29.9 |
| Pull Out (lbs) 72 hr. cure | 1530 | 1620 | 2210 | 2580 | 2540 | 2600 |

Pull out was conducted using medium weight concrete blocks.

| Size (microns) | Filler |
|---|---|
| 2 | Tamsil ™ 8 |
| 8 | ATH 00 20774 |
| 200 | F55 Silica Sand |

-continued

| Size (microns) | Filler |
|---|---|
| 50 | Huber SB-30-SP |
| 150 | Quartz 1/2 |

Each of the compositions were mixed by hand and injected using a dispensing gun containing a one component cartridge.

To achieve the desired pull out performance, the anchor composition of the present invention includes a filler, preferably an inorganic, insoluble, inert filler. Table 3 shows that the pull out strength of an anchor composition increases with increased particles size of the filler.

Example 10

Pull Out Performance in 5,000 psi Compressive Strength Concrete

|  | Ready Fix | Composition of Example 1* |
|---|---|---|
| Pull Out (lbs) 2 hr cure | 5800 | 6000 |
| Pull Out (lbs) 24 hr cure | 7100 | 7200 |

Pull Out and Torque Performance in Hollow Concrete Blocks

|  | C-Mix 3000 | Composition of Example 1* |
|---|---|---|
| Pull Out (lbs) 2 hr cure | 1080 | 1310 |
| Pull Out (lbs) 24 hr cure | 18.1 | 20.3 |

C-Mix 3000 is a commercially available aromatic polyester anchor adhesive, which can be obtained from SPIT, France.
*Compositions were the same as those of Example 1, except that no fragrance was added.

The composition of Example 1 above was compared to commercial products in 5,000 psi compressive strength concrete and in 5 5/8×7 5/8×15 5/8 inch hollow concrete block. The performance of the composition of Example 1 is equivalent or superior to commercial adhesives based on aromatic polyesters and aromatic vinyl esters.

Example 11

The following example compares a commercially available anchor adhesive that is delivered using a glass capsule with compositions of the present invention, which are delivered using a glass capsule. Each of anchor composition A and B comprised 21.90% PMMA/MMA solution, 41.3% quartz 4, 0.88% HET, 1.8% Lucidol CH50 BPO and 33.7% glass (from the glass capsule, which acts as a filler when crushed).

Table 4 below shows the pull out strengths of the various compositions in 5,000 psi compressive strength concrete.

TABLE 4

|  | Hilti HEA | A | B |
|---|---|---|---|
| Polymer |  | 2021 | 2008 |
| % polymer in Solution |  | 20 | 30 |
| Dodecyl mercaptan (%) |  |  | 0.43 |
| Pull Out (lbs) - 1 hour | 16600 | 13130 | 16600 |
| Pull Out (lbs) - 24 hour | 16800 | 14530 | 16700 |

Hilti HEA can be obtained from the Hilti Corporation, Tulsa, Okla. Lucidol CH50 can be obtained from ATOCHEM, Buffalo, N.Y.

Example 12

The following example compares two pairs of anchor adhesive compositions. The first pair of anchor adhesive compositions contain a methacrylate ester/ethyl acrylate copolymer in concentrations of 20 and 30% by weight of monomer solution. The second pair of anchor adhesive compositions contain a methacrylate ester/methacrylic acid copolymer also in concentrations of 20 and 30%; by weight of monomer solution. Apart from the differences in copolymer composition and concentration, all of the anchor adhesives were composed of two compositions combined in a 10 to 1 ratio. The first composition comprises about 43.3% by weight of monomer/copolymer solution, about 4.1% by weight Aerosil® R202, 0.016% by weight trimethyl hydroquinone, about 0.52% by weight dodecyl mercaptan, about 0.052% by weight HET, and about 51.5% by weight 100-140 silica sand. The second composition comprises about 49.8% by weight AFR 400 (40% BPO), about 19.9% by weight Agsco quartz ½, about 29.9% by weight Tamsill™ 8, and about 0.51% by weight VC-80000 Black (iron oxide).

Table 5 below shows the pull out strengths of the various compositions in medium weight concrete block after 0.5 hours of cure at 72° F. Table 5 also shows the reaction exotherm data in maximum temperature and the maximum temperature achieved by the compositions at 72° F. Table 5 further shows the pull out strengths of the various compositions when molded and tested in steel molds. This test, referred to herein as the conical mold pull test, provides a method of eliminating the experimental variable associated with the conditions of the concrete block. Table 6 shows the pull out strengths of the various compositions in medium weight concrete block after one and two hours of cure at 20° F. These data demonstrate the superior cure times of the MMA/MAA copolymer compositions as compared to the MMA/EA copolymer compositions.

TABLE 5

| Composition | Pull Test at 72° F. ½ hr. cure (lbs) | Exotherm Test at 72° F. Time* (sec) | Exotherm Test at 72° F. temp** (° C.) | Conical Mold Pulls 72° F. 1 hr. cure (lbs) |
|---|---|---|---|---|
| 20% 2008C | 3810 | 540 | 103 | 6820 |
| 30% 2008C | 3750 | 465 | 115 | 6550 |
| 20% 2021C | 3310 | 730 | 105 | 5490 |
| 30% 2021C | 3110 | 690 | 105 | 5710 |

*Time to maximum temperature
**Maximum temperature

TABLE 6

| Composition | Pull Test at 20° F. 1 hr. cure (lbs) | Pull Test at 20° F. 2 hr. cure (lbs) |
|---|---|---|
| 20% 2008C | NC | 3850 |
| 30% 2008C | 1410 | 3300 |
| 20% 2021C | NC | 3440 |
| 30% 2021C | 1180 | 2590 |

NC—Not cured

What is claimed is:

1. A composition for anchoring materials in or to concrete or masonry, which composition comprises:
   a. alkylacrylate ester monomer;
   b. a copolymer or alkylacrylate ester and methacrylic acid monomers;
   c. a filler;
   d. a free-radical catalyst, and
   e. from about 1 part per million to about 0.5 wt. % of a promoter comprising an organic salt of a transition metal, wherein said wt % is based upon the total weight of the composition.

2. The composition of claim 1 wherein the polymer to monomer ratio is in the range of about 1 to 9 to about 2.5 to 1 by weight.

3. The composition of claim 1 wherein the polymer to monomer ratio is in the range of about 1 to 4 to about 1 to 2.5 by weight.

4. The composition of claim 1 wherein the combination of monomer and copolymer comprises about 20% to about 90% of the composition.

5. The composition of claim 1 wherein the combination of monomer and copolymer comprises about 20% to about 45% of the composition.

6. The composition of claim 1 wherein the filler comprises from about 10% to about 90% by weight of the composition.

7. The composition of claim 1 wherein the filler comprises from about 40% to about 80% by weight of the composition.

8. The composition of claim 1 further comprising a chain transfer agent.

9. The composition of claim 1 further comprising a free-radical inhibitor.

10. The composition of claim 1 further comprising an activator.

11. A composition for anchoring materials in or to concrete or masonry that is made by mixing a first composition, which first composition comprises:
   a. a solution of methacrylate ester monomer and methacrylate ester/methacrylic acid copolymer; and
   b. a filler; and
a second composition, which second composition comprises:
   a. a free-radical catalyst; and
   b. from about 1 part per million to about 0.5 wt. % of a promoter comprising an organic salt of a transition metal, wherein said wt % is based upon the total weight of the composition.

12. The composition of claim 11 wherein the polymer to monomer ratio is in the range of about 1 to 9 to about 2.5 to 1 by weight.

13. The composition of claim 11 wherein the polymer to monomer ratio is in the range of about 1 to 4 to about 1 to 2.5 by weight.

14. The composition of claim 11 wherein the monomer/copolymer solution comprises about 20% to about 90% of the composition.

15. The composition of claim 11 wherein the monomer/copolymer solution comprises about 20% to about 45% of the composition.

16. The composition of claim 11 wherein the first composition further comprises a chain transfer agent.

17. The composition of claim 11 further comprising a free-radical inhibitor.

18. The composition of claim 11 further comprising an activator.

19. The composition of claim 11 wherein the second composition further comprises a filler.

* * * * *